Figure 1:
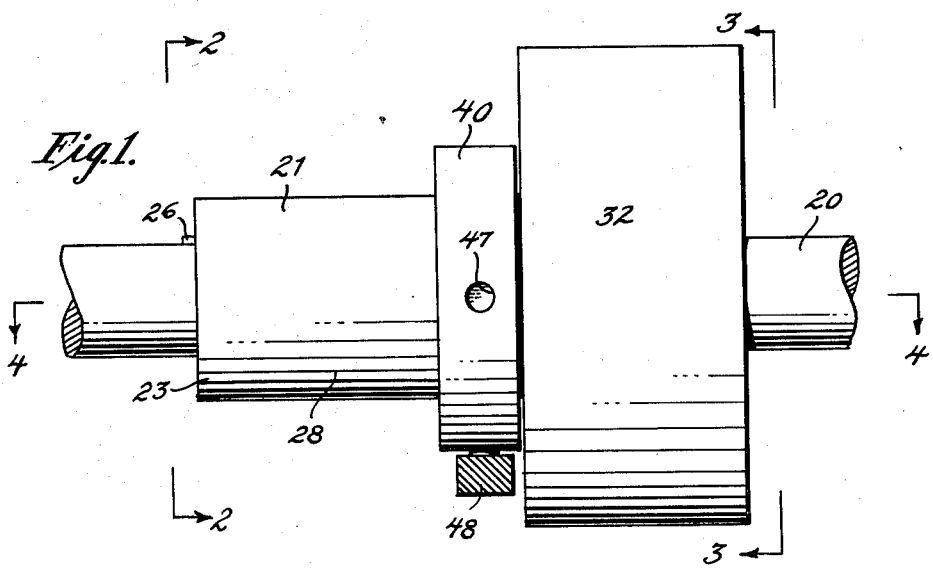

July 5, 1960   C. W. MUSSER   2,943,465
ADJUSTABLE SPLINE
Filed Dec. 16, 1957   2 Sheets-Sheet 1

INVENTOR
C. WALTON MUSSER
BY
ATTORNEYS

July 5, 1960
C W. MUSSER
2,943,465
ADJUSTABLE SPLINE
Filed Dec. 16, 1957
2 Sheets-Sheet 2
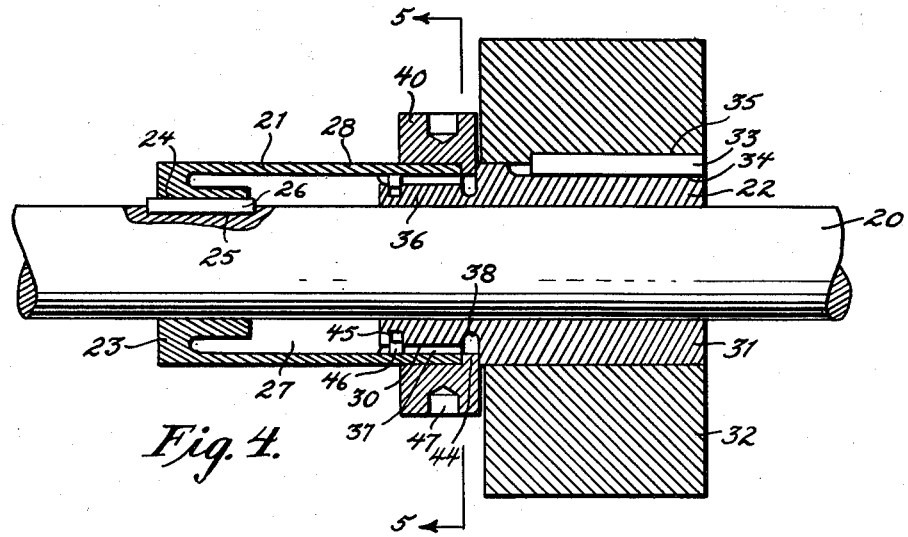
Fig. 4.
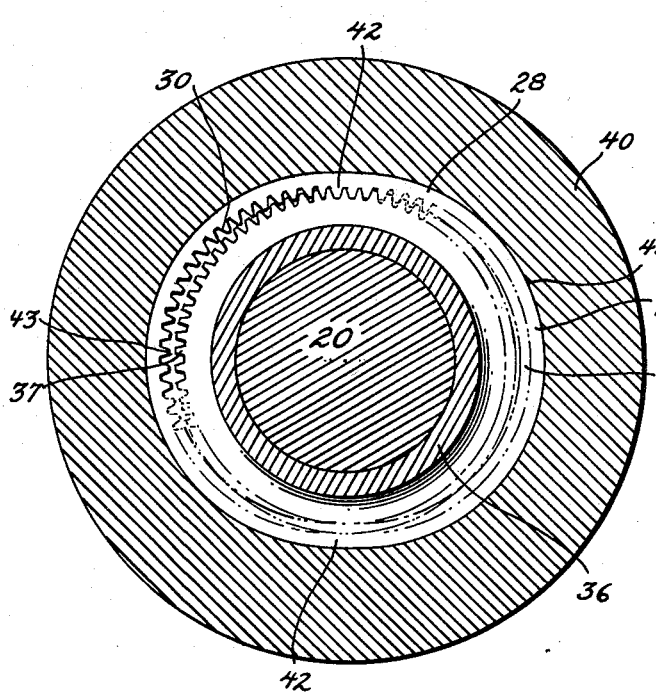
Fig. 5.
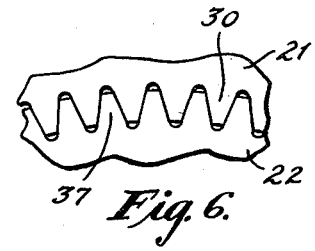
Fig. 6.
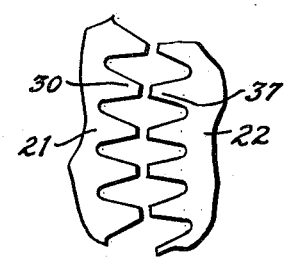
Fig. 7.
INVENTOR
C. WALTON MUSSER
BY
ATTORNEYS United States Patent Office 2,943,465
Patented July 5, 1960

2,943,465
ADJUSTABLE SPLINE
C Walton Musser, Beverly, Mass., assignor to United Shoe Machinery Corporation, Boston, Mass., a corporation of New Jersey Filed Dec. 16, 1957, Ser. No. 703,199
4 Claims. (Cl. 64—24)

The present invention relates to adjustable splines for positioning a machine element on a shaft and precisely adjusting the angular relationship of the machine element with respect to the shaft.

A purpose of the present invention is to permit micrometric adjustment of a machine element around the shaft without requiring the use of complicated or expensive equipment which would add greatly to the cost and size.

A further purpose is to permit the production of adjustable splines which will precisely position machine elements around shafts, as stock items which can be warehoused and adjusted at assembly like collars, flanges, keys and other standard parts.

A further purpose is to make a machine element infinitely adjustable throughout the entire 360 degree range.

A further purpose is to provide an accuracy of adjustability less than 1 minute of arc.

A further purpose is to secure zero backlash in the adjustment by virtue of the fact that a multiplicity of teeth are always in engagement in each of a plurality of engaging areas.

A further purpose is to provide an adjustable spline which is tubular in shape and short in length and therefore has high torsional rigidity.

A further purpose is to provide an adjustable spline which has greater torque capabilities than the shaft on which it is mounted.

A further purpose is to make the spline adjustment self-locking so that the adjusting element will retain its position under all conditions of vibration.

A further purpose is to graduate the adjustable spline so that the settings may be duplicated by reading graduations.

A further purpose is to provide an adjustable spline which is symmetrical and therefore does not present any problem of dynamic or static balance.

A further purpose is to permit wider machining tolerances on machine elements so that the cost of production of the parts can be reduced and adjustment permitted.

A further purpose is to avoid the requirement of rotational alignment of parts in connection with the design of the parts and permit this to be done in the field.

A further purpose is to avoid the necessity of justifying keyways and splines to the outer contours of cams and gears.

Further purposes appear in the specification and in the claims.

In the drawings I have chosen to describe one only of the numerous embodiments in which my invention may appear, selecting the form shown from the standpoints of convenience in illustration, satisfactory operation and clear demonstration of the principles involved.

Figures 2, 3:
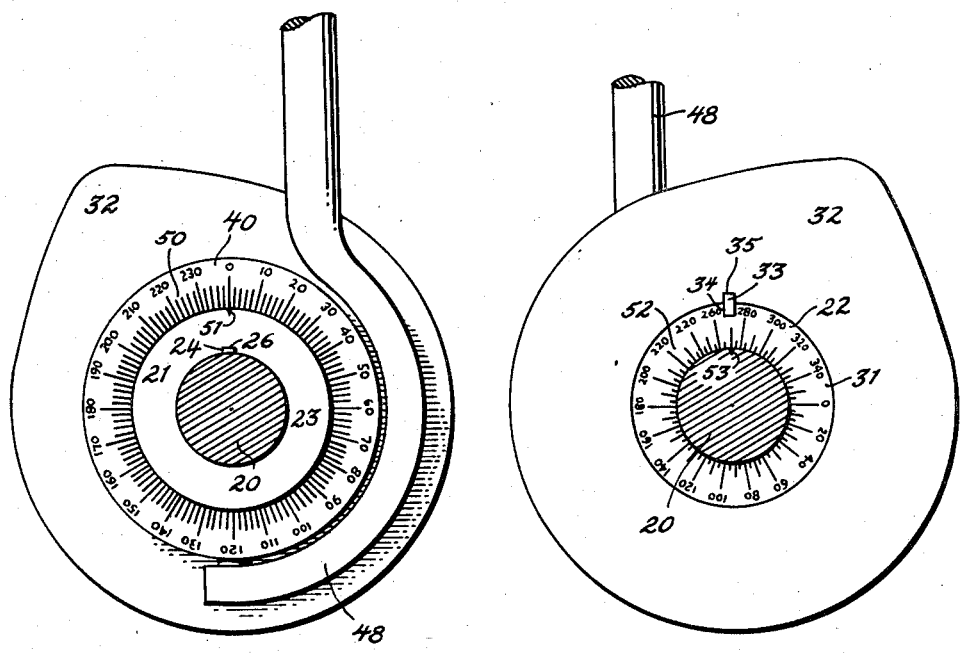

Figure 1 is a side elevation of the device of the invention.
Figure 2 is a section of Figure 1 on the line 2—2.
Figure 3 is a section of Figure 1 on the line 3—3.
Figure 4 is an axial section of Figure 1 on the line 4—4.
Figure 5 is an enlarged partially diagrammatic transverse section of Figure 4 on the line 5—5.

Figure 6 is an enlargement of a portion of Figure 5 where the teeth are mating.
Figure 7 is an enlargement of a portion of Figure 5 where the teeth are nonmating.

Describing in illustration but not in limitation and referring to the drawings:

In the prior art there are numerous cases where machine elements such as cams, gears, torque tubes or bars, eccentric bushings, rocker arms, bellcranks, springs, cranks and stops must be precisely angularly positioned on shafts. This is often troublesome and expensive both from the standpoint of the designer and the fabricator. The keyway must often be accurately located angularly, and if wear occurs in service it is very difficult to readjust the parts.

By the present invention it is possible to position a machine element on a shaft by an adjustable spline which is relatively small and simple in construction, which rigidly positions the machine element, and yet permits adjustment. Adjustment is permitted infinitely throughout 360 degrees and with an accuracy of less than 1 minute of arc.

The device is without backlash because of the multiple tooth engagement.

The torque capabilities of the spline device can readily be made greater than that of the shaft on which the spline is mounted and adjustment is readily made self-locking and retains its position regardless of vibration.

Readings are easily made and reproducibe and settings can be determined by graduations on scales.

Since the device is symmetrical, no problem is presented in regard to balance.

Considering now the device as shown in the drawings, I there illustrate a shaft 20 which from the standpoint of the present invention may be solid as shown or tubular, and which is surrounded and fitted by a first collar 21, and by a second collar 22, which is suitably axially displaced from the first collar but telescopes within it for a portion of the length.

The first collar 21 has a head or hub portion 23 which closely conforms with the exterior of the shaft, and which is provided with a keyway 24 which cooperates with a keyway 25 in the shaft to receive any suitable key 26 and restrain the first collar against relative rotation with respect to the shaft.

Beyond the body, the first collar is bored at 27 to provide a relatively thin elastically deflectable sleeve 28 which extends longitudinally from the body to the opposite end of the first collar. At the end remote from the body, the sleeve is provided with a series of internal gear teeth 30 which extend continuously around the interior to form a set of teeth as later described.

The second collar 22 has a body portion 31 which closely conforms to and engages the outside of the shaft, and surrounding the body portion and supported on it there is a machine element 32 illustrated in this case as a cam. Relative rotation between the machine element and the second collar is prevented by a key 33 which engages in a slot 34 extending longitudinally of the outside of the second collar body and a cooperating slot 35 extending longitudinally within the machine element.

The second collar has an extension 36 which extends within the sleeve portion of the first collar 21 and has a set of external gear teeth 37 which have the same tooth form and size as the gear teeth 30 on the inside of the first collar and mesh with them at certain points as later explained.

An annular slot 38 is provided in the second collar between the body and the external gear teeth 37.

The sleeve 28 of the first collar is surrounded and firmly engaged by a relatively rigid ringlike wave generator 40 which has an elliptoidal interior contour 41 which deflects the sleeve 28 into an elliptoidal contour at its end as best seen in Figure 5, and maintains the set of internal teeth 30 in an elliptoidal shape as there shown.

Since the set of teeth on the second collar is of circular form, it will be evident that the internal teeth on the first collar engage teeth on the outside of the second collar at areas 42 to create the relationship in which several teeth are mating, as shown in Figure 6, while at intervening areas 43 the teeth are completely out of engagement or nonmating as well as nonmeshing, as shown best in Figure 7.

In this case, two meshing and contacting areas 42 are shown, but it will be evident that it is not critical in the present invention as to whether two or three or more meshing and contacting areas are employed, with intervening nonmeshing and noncontacting areas. It is important, however, that the difference in the number of teeth of the inner set and the outer set conform to the number of meshing and contacting areas of the teeth, that is, the difference in the number of teeth should be the same as or a multiple of the number of meshing and contacting areas. Thus in the case where there are two mating areas as shown in the drawings, the difference in the number of teeth of the inner set and the outer set should be 2, 4, etc. Since the periphery of the outer set of teeth is greater, it will be evident that the larger number of teeth should be on the outer set.

It will be understood that the explanation of harmonic gearing is set forth more in detail in my copending application Serail No. 495,479, filed March 21, 1955, for Strain Wave Gearing now U.S. Patent No. 2,906,143, granted September 29, 1959.

The wave generator 40 beyond its elliptoidal inner contour desirably has a flange 44 which extends into the spaced provided endwise between the first collar and the second collar in line with the slot 38 and thus restrains the wave generator against sliding endwise.

Beyond the teeth on the second collar, there is desirably provided an exterior annular slot 45 which receives a snap sealing ring 46 which springs outwardly and engages the interior of the sleeve 28 and serves to retain the parts together and as a lubricant seal at one end, the other end being sealed by the flange 44 on the wave generator.

The wave generator is turned in any suitable manner, as by providing flats as on a nut, or as shown by spanner holes 47 which receive a spanner wrench 48, as illustrated.

In the preferred embodiment, tight frictional engagement by the wave generator on the outside of the first collar 21 is assured so that a considerable frictional retentive action will always be exerted on the wave generator, holding it in any adjusted position notwithstanding vibration which may be encountered in the rotating parts.

The wave generator is desirably made sufficiently tight in its fit on the sleeve of the first collar so as to spring load the collar and thus spring load the gear teeth at the area of engagement so as to provide for engagement over several teeth and thus further protect against backlash. The preload of the teeth assures that the wave generator will not change its adjustment without a wrench.

To facilitate accurately reestablishing any adjustment, the wave generator is subdivided in minutes of arc to form a scale 50 best seen in Figure 2 and the scale cooperates with an index mark 51 provided on the outside of the first collar 21.

Since the spline gearing acts as a micrometer and provides an accurate adjustment within one-quarter of a minute of arc with the wave generator, the scale 50 will accurately determine the fine adjustment.

The coarse adjustment of the machine part with respect to the shaft is desirably provided by a scale 52 (Figure 3) graduated in degrees on the end of the second collar which is visible to the observer. This scale cooperates with an index mark 53 on the shaft 20.

In operation, the first and second collars and the wave generator are desirably sold as a unit. To install the device, the key 26 is properly placed and the first collar is assembled with respect to the key.

Then the machine element is put in position surrounding the second collar and the key 33 is inserted.

To accomplish adjustment, it is merely necessary to apply the spanner or other wrench to the wave generator and keep turning the wave generator until the desired position of the machine element is reached. By recording the coarse reading in degrees from the scale 52 and the micrometer reading in minutes from the scale 50 it is possible to establish a setting which can be later restored after the adjustment has been changed.

A wide variety of uses may be made of the device of the invention. For example, a cam can be designed without regard to its angular placement and then accurately adjusted in position at assembly. Likewise a lever can be properly positioned in relation to other mechanism by changing the adjustment through the wave generator.

Similarly, a gear which must maintain a certain relation to other gearing can be properly adjusted on a shaft by the present invention.

The invention also may be applied to adjust the end of a torque tube or bar on a shaft.

A useful application of the invention is for adjusting an eccentric bushing in correct angular position.

The invention may also be used to adjust rocker arms or bellcranks and to vary the throw of cranks.

Wide use of the invention is possible in connection with springs where accurate angular position is required, to adjust torsion, involute or spiral springs. The invention can also be used effectively to preload springs to a desired value.

In the case of oscillatory motions, stops must be accurately adjusted, and the invention can be used effectively to determine the positions of oscillatory stops.

In a wide variety of different types of machinery, the invention can be employed to compensate for wear. It can also adjust elements such as gripping elements or timing elements to allow for differences in the material operated on or differences in size of the device being produced.

The invention could, for example, be applied to adjust torque bars on the front end suspension of an automobile to correct for spring creep.

It will be evident that the spline of the invention has tooth engagement at the areas of engagement which is identical to a zero clearance conventional spline, but is unusual in the following respects:

(1) During adjustment there is the same pitch line velocity on the spline teeth of the both sets.

(2) Also the mating teeth of the two sets during adjustment are angularly stationary with respect to each other.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In an adjustable spline, a first collar, a second collar having a portion extending into telescoping relation with the first collar, inner and outer sets of cooperating gear teeth, one set on the first collar and the other set on the second collar, the gear teeth having the same tooth form and meshing and contacting at a plurality of spaced areas with intermediate areas where the teeth are nonmeshing and noncontacting, there being a difference in the number of teeth of the two sets which conforms to the number of meshing and contacting areas or a multiple thereof, and a wave generator deflecting the gear teeth on one of the collars into meshing and contacting engagement with the gear teeth on the other collar and frictionally engaging with respect to one of the collars in a self-locking relationship.

2. An adjustable spline of claim 1, in which the outer of the two collars has a shaft engaging portion axially displaced with respect to the inner of the two collars, and extending radially inwardly to a position corresponding to the position of the inside of the inner of the two collars, and in which the wave generator surrounds the outer of the two collars.

3. In an adjustable spline for attaching a machine element to a shaft and permitting precise angular adjustment of the machine element with respect to the shaft, a first collar adapted to surround the shaft, means for securing the first collar in a particular angular relationship with respect to the shaft, a second collar adapted to surround the shaft and extending into telescoping relationship with the first collar, means for securing the second collar to a machine element in a fixed angular relationship to the machine element, inner and outer sets of cooperating gear teeth, one on the first collar and the other on the second collar, the gear teeth having the same tooth form and meshing and contacting with one another at a plurality of spaced areas with intermediate areas where the gear teeth are nonmeshing and noncontacting, there being a differenece in the number of teeth of the two sets which corresponds to the number of meshing and contacting areas of the gear teeth around the circumference or a multiple thereof, a wave generator surrounding and engaging the outermost of the collars at the location of the gear teeth, deflecting the gear teeth on the outermost collar into meshing and contacting engagement aforesaid, and frictionally engaging the outermost collar and rendering the device self-locking in any position of adjustment of the wave generator, and means for turning the wave generator with respect to the outermost collar.

4. In an adjustable spline for attaching a machine element to a shaft and permitting precise angular adjustment of the machine element with respect to the shaft, a first collar adapted to surround the shaft and having a shaft engaging portion at its inside, means for securing the first collar in a particular angular relationship with respect to the shaft, a second collar adapted to surround the shaft, having a shaft engaging portion at its interior and extending axially to a position at which it is in telescoping relationship with the first collar, means for securing the second collar to a machine element in a fixed angular relationship to the machine element, inner and outer sets of cooperating gear teeth, one on the first collar and the other on the second collar, the gear teeth having the same tooth form and meshing and contacting with one another at a plurality of spaced areas with intermediate areas where the gear teeth are nonmeshing and noncontacting, there being a difference in the number of teeth of the two sets which corresponds to the number of meshing and contacting areas of the gear teeth around the circumference or a multiple thereof, a wave generator surrounding and engaging the outermost of the collars at the location of the gear teeth, deflecting the gear teeth on the outermost collar into a generally elliptoidal contour, means for further deflecting the outermost collar to broaden the area of contact between the gear teeth and render the device self-locking in any position of adjustment of the wave generator, and means for turning the wave generator with respect to the outermost collar.

References Cited in the file of this patent

FOREIGN PATENTS 249,805     Great Britain _____ Oct. 14, 1926